United States Patent
Pattee

[19]

[11] Patent Number: 6,029,479
[45] Date of Patent: Feb. 29, 2000

[54] FINE PARTICLE LINT FILTER

[76] Inventor: Harley J. Pattee, 10143 Allenby Ct., Orlando, Fla. 32821

[21] Appl. No.: 09/038,392

[22] Filed: Mar. 11, 1998

[51] Int. Cl.⁷ .............................. D06F 39/10; B01D 29/05
[52] U.S. Cl. ........................... 68/18 F; 210/314; 210/335
[58] Field of Search ............................ 68/18 F; 134/111; 210/314, 335

[56]  References Cited

U.S. PATENT DOCUMENTS

| 1,573,929 | 2/1926 | Gall | 210/314 X |
| 1,657,482 | 1/1928 | Pine | 68/18 F X |
| 1,889,325 | 11/1932 | Whaley | 210/335 X |
| 2,248,077 | 7/1941 | Harris | 210/314 X |
| 5,709,235 | 1/1998 | Akanuma et al. | 134/111 |

FOREIGN PATENT DOCUMENTS

| 119419 | 4/1901 | Germany | 210/314 |
| 3507229 | 9/1986 | Germany | 134/111 |
| 3833668 | 4/1990 | Germany | 68/18 F |
| 131798 | 6/1986 | Japan | 68/18 F |
| 102030 | 7/1941 | Switzerland | 68/18 F |

*Primary Examiner*—Philip R. Coe
*Attorney, Agent, or Firm*—Bencen & Van Dyke, P.A.; Timothy H. Van Dyke; Gerard H. Bencen

[57]   ABSTRACT

A lint filter having a succession of mesh screens which are arranged in parallel in a tank which receives lint-containing water from a laundry facility. The mesh screens are positioned so that the lint-containing water must pass through the screens in order to leave the tank. The lint-containing water is sprayed evenly on one side of the tank and proceeds across the tank toward the mesh screens. The mesh screens are angled so that lint and particles contained in the lint-containing water are allowed to fall to the bottom of the tank. Multiple exits allow lint-filtered water to leave the lint filter.

14 Claims, 10 Drawing Sheets

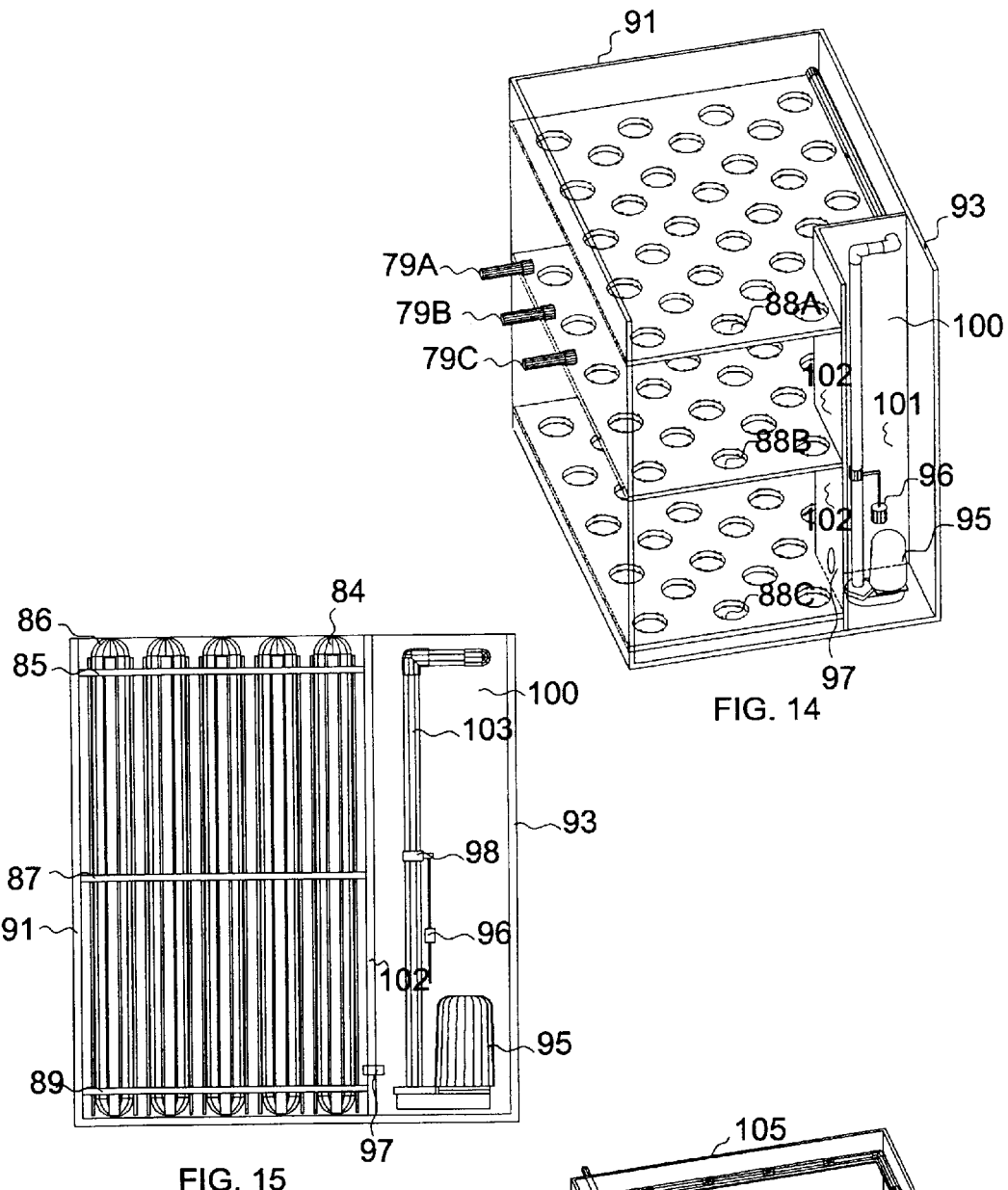

FINE PARTICLE LINT FILTER

BACKGROUND OF THE INVENTION

1. Field of the Invention

The present invention pertains to filters for removing unwanted elements from water of other fluids. More particularly, the present invention pertains to a lint filter for filtering out small, fine particles such as hair, thread, etc., from water.

2. Background of the Invention

At the present time, facilities such as motels and hotels, for example, do extremely large quantities of laundry on a daily basis. The water costs incurred in such operations is enormous. Further, many motels and hotels, as a result of their huge water use, are exposed to substantial impact fees. These impact fees and costs can literally amount to hundreds of thousands of dollars.

Water recycling systems are known to be in use in conjunction with car and truck washes. One example of such a system is U.S. Pat. No. 5,374,352 entitled "Universal Recycled Wash Water System" which is herein incorporated by reference.

However, systems used to recycle water in truck and car washes would not be appropriate for the re-use of water in laundry facilities.

In light of the extraordinary expenditures which are now being realized in the hotel industry and other laundry-intensive businesses, a great need is seen for a recycling system for laundry water—so that the same water can be used again and again to minimize costs associated with doing laundry.

SUMMARY OF THE INVENTION

Accordingly, one object of the present invention is to provide a lint filter which will effectively remove small particle lint from a water source.

Yet another object of the present invention is to minimize water costs associated with doing laundry or dish washing.

Still another object of the present invention is to minimize energy costs associated with doing laundry or dish washing.

These and other valuable objects of the present invention are provided by a recycling system having a collection tank for receiving used wash water from a washing machine.

A holding tank is linked by piping to the collection tank with the holding tank having the dual purpose of providing a means of storing used wash water and a further purpose of transferring heat to heat exchange piping located in the interior of the holding tank.

The heat exchange piping in the interior of the holding tank is used as a heat exchange means and receives the used wash water after it has been processed and cleaned by the respective cleaning and processing elements of the present invention. Therefore, the heat exchange piping inside of the holding tank is for accommodatingclean and processed water which has gone through the recycling system. The used wash water inside of the holding tank is used as a heat source for transferring thermal energy to the heat exchange piping so as to heat the clean and processed water therein.

A lint/grit separator for removing suspended solids and lint from the used wash water is connected to the holding tank by means of piping. Lint and grit exceeding a specific size are removed from the used wash water by the lint/grit separator so that lint-grit separated water proceeds forward to a lint filter. Suspended solids and lint which exceed a predetermined size fall from the lint/grit separator to a lint/grit collection basket.

The lint filter receives the lint/grit separated water and removes smaller-size lint and grit from the lint-grit separated water. Having passed through the lint filter, lint-filtered water exits the lint filter and continues to an oil absorption filter.

The oil absorption filter removes free oil having a density less than water from the lint-filtered water. Upon passing through the oil absorption filter, the lint-filtered water becomes oil-filtered water and exits the oil absorption filter through piping to a media filter.

Upon the oil-filtered water entering the media filter, suspended solids and various hydrocarbons are removed from the oil-filtered water so that media-filtered water exits the media filter and is channelled to a hydrocarbon absorption filter.

The hydrocarbon absorption filter removes emulsified hydrocarbons and some heavy metals from the media-filtered water so that absorption-filtered water exits the hydrocarbon absorption filter through piping to an activated carbon filter.

The activated carbon filter removes remaining organic compounds including surfactants from the absorption-filtered water so that clean and processed water exits the activated carbon filter.

The clean and processed water upon exiting the activated carbon filter enters a final holding tank where it is connected to piping which branches in two—with one branch exiting to a cold water server located outside the recycling system and the other branch connecting to the heat exchange piping in the interior of the holding tank.

The clean and processed water upon entering the heat exchange piping is heated by the used wash water which surrounds the heat exchange piping, so that upon exiting the holding tank, heated clean and processed water is channelled through piping to a hot water server located outside of the recycling system. From the cold and hot water servers, water can be re-introduced for use by washing machines for the cleaning of laundry, etc.

The collection tank, holding tank, separator, lint filter, oil filter, media filter, absorption filter, carbon filter and final holding tank are to be viewed as elements of the recycling system of the present invention.

Connected to and utilized by the elements of the recycling system are ozone generators (used to further purify the water channelled through the recycling system), and sump pumps and centrifugal pumps which are used to move water through the system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 14 is a see through perspective view of the oil absorption filter of FIG. 13 with the hydrophobic socks removed;

FIG. 15 is a see-through side view of the oil absorption filter of FIG. 13;

FIG. 16 is a see-through perspective view of the media filter of the present invention;

When referring to the drawings, it should be understood that like reference numerals designate identical or corresponding parts throughout the respective figures.

THE DETAILED DESCRIPTION OF THE INVENTION

Figure 1:
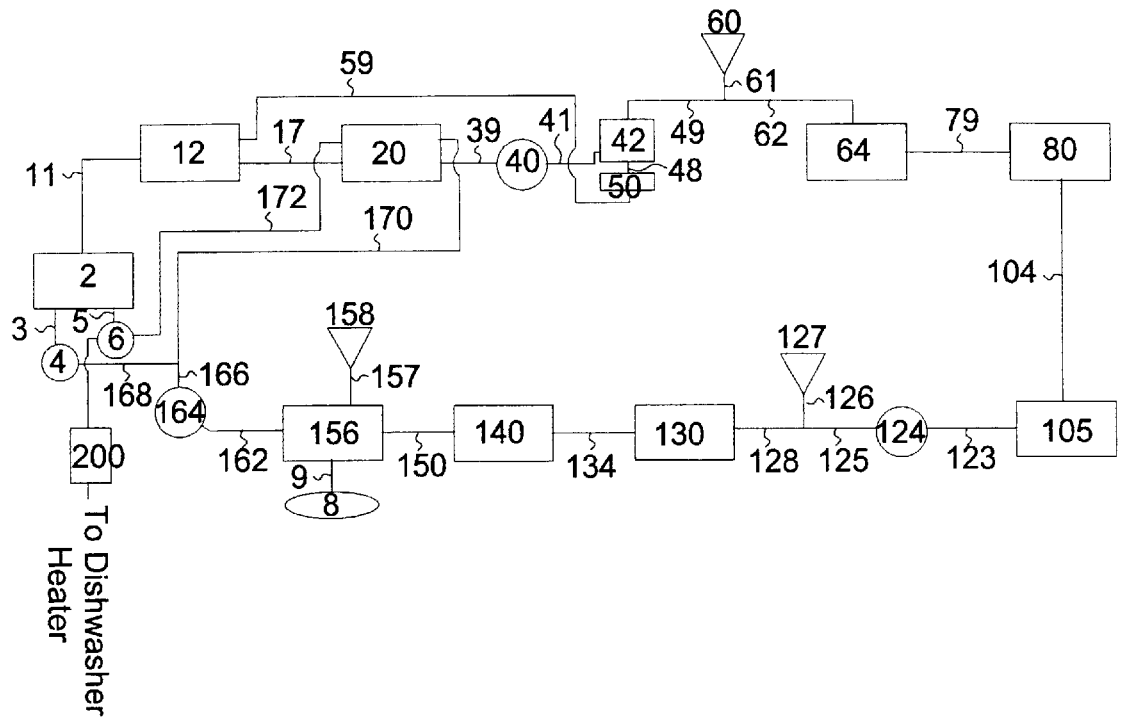
FIG. 1 is a block diagram of the elements of the recycling system of the present invention and of components connected to the system.
Figure 2:
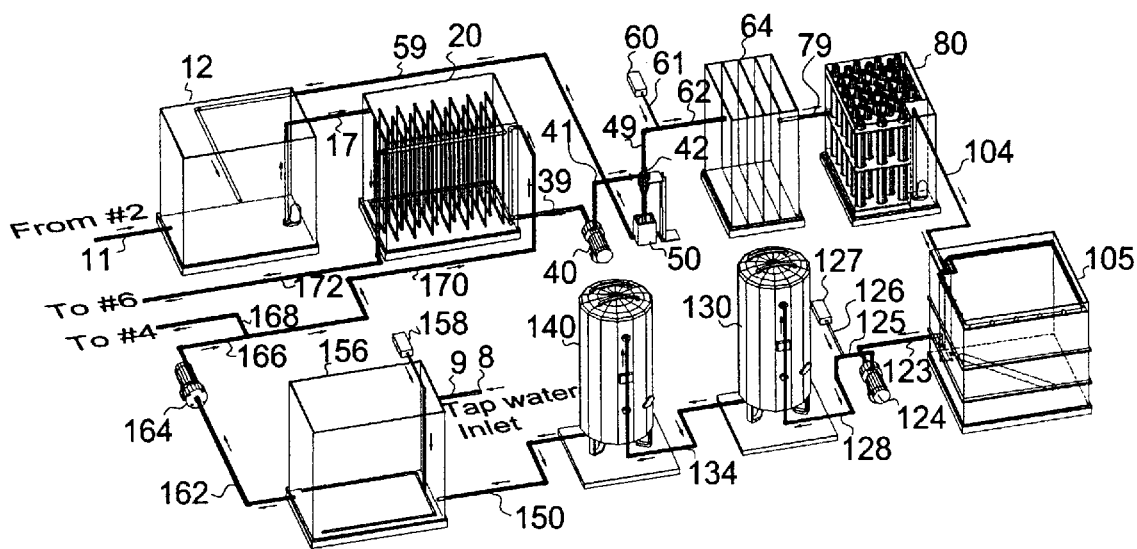
FIG. 2 is a perspective flow diagram of the elements of the recycling system of the present invention.

With reference to the block diagram of FIG. 1 and to the perspective flow diagram of FIG. 2, used wash water $W_{uw}$ from wash machine(s) 2 travels through pipeline 11 to collection tank 12 of recycling system 10. Collection tank 12 is connected through pipeline 17 to holding tank 20. Holding tank 20 has the dual purpose of serving as a holding tank and heat reclamation mechanism as will be subsequently explained.

The used wash water $W_{uw}$ from wash machine 2 having been channeled through collection tank 12 and through holding tank 20 continues through pipeline 39 to a centrifugal pump 40 where it is accelerated into lint/grit separator 42. Suspended solids and lint which exceed a predetermined size are channelled into pipe 48 and to lint/grit collection basket 50. Pipeline 59 connects lint/grit basket 50 to collection tank 12 so that water accumulating in lint/grit basket 50 is returned to collection tank 12.

Lint/grit separated water $W_{lg}$ proceeds from the lint/grit separator 42 through pipeline 49 where it is injected with ozone from ozone generator 60.

Ozone traveling from ozone generator 60 is injected into the stream of lint/grit separated water $W_{lg}$ traveling through pipeline 49 as it connects to pipe 61 connected to the ozone generator 60. The lint/grit separated water then enters pipeline 62 before being introduced to lint filter 64.

Lint filter 64 removes smaller lint from the lint-grit separated water $W_{lg}$ whereupon the lint/grit separated water is further processed so as to become lint-filtered water $W_{lf}$ before entering pipeline 79.

Through pipeline 79 lint-filtered water $W_{lf}$ is channelled to oil absorption filter 80 which removes oils having a density less than water such that the lint filtered water $W_{lf}$ becomes oil filtered water Wof.

Pipeline 104 serves as the link between oil absorption filter 80 and media filter 105 and channels the oil filtered water from absorption filter 80 to media filter 105.

The Media filter 105 removes suspended solids and various hydrocarbons such that the oil filtered water $W_{of}$ becomes media filtered water $W_{mf}$. The media filtered water $W_{mf}$ exits the media filter 105 through pipeline 123 which connects to centrifugal pump 124. After entering centrifugal pump 124 the media-filtered water is injected with ozone from ozone generator 127, which connects to the piping 125 leading from centrifugal pump 124, through pipe 126.

The media filtered water $W_{mf}$ having received an injection of ozone from ozone generator 127 proceeds to the hydrocarbon absorption filter 130 through pipeline 128.

Hydrocarbon absorption filter 130 removes emulsified hydrocarbons and some heavy metals from the media filtered water received from media filter 105 such that the media filtered water $W_{mf}$ becomes absorption filtered water $W_{af}$.

From the hydrocarbon absorption filter 130, the absorption filtered water $W_{af}$ is channeled through pipeline 134 to activated carbon filter 140.

Activated carbon filter 140 is designed to remove any remaining organic compounds such that the absorption filtered water becomes carbon filtered water $W_{cf}$.

The carbon filtered water $W_{cf}$ exits the activated carbon filter 140 through pipeline 150 which connects to final holding tank 156.

The final holding tank 156 is connected by pipe 157 to an ozone generator 158 through which more ozone is injected into the carbon filtered water received from the activated carbon filter 140. Tap water 8 is introduced into final holding tank 156 through pipeline 9 to recoup water lost in the recycling process. Clean and processed water $W_{cp}$ exits final holding tank 156 through pipeline 162.

Pipeline 162 connects to centrifugal pump 164 where the clean and processed water $W_{cp}$ is pumped through pipeline 166 which connects to pipelines 168 and 170. Pipeline 168 is connected to cold water server 4 which connects to wash machine(s) 2 through pipeline 3.

Pipeline 170 directs clean and processed water $W_{cp}$ to heat exchange piping 26 (not shown in FIG. 1) located inside of holding tank 20.

The warm, used wash water received by holding tank 20 from the collection tank 12 serves to heat the clean and processed water inside the heat exchanger 26 such that upon exiting the holding tank 20 through pipeline 172 the clean and processed water is channelled to hot water server 6 for re-use by wash machine 2.

In operation the recycling system of the present invention can be connected through line 11 (FIG. 1 and 2) to the water discharged from a plurality of wash machines and dishwashers.

Figure 3:
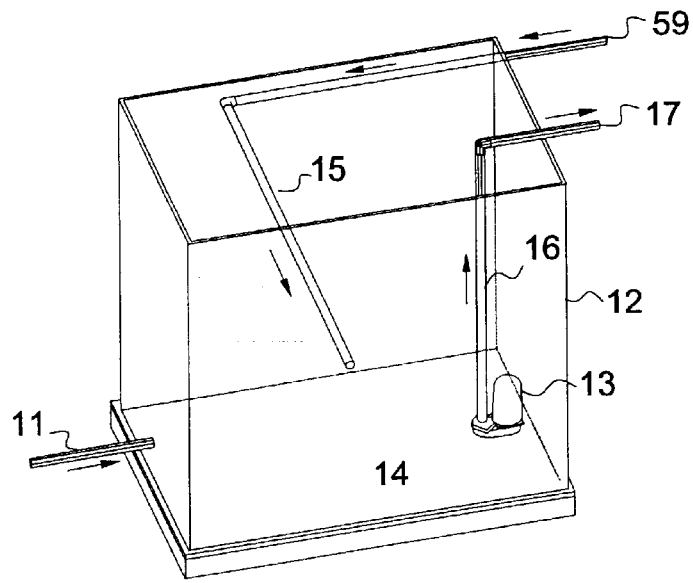
FIG. 3 is a perspective see-through view of the collection tank according to the present invention.
Figure 4:
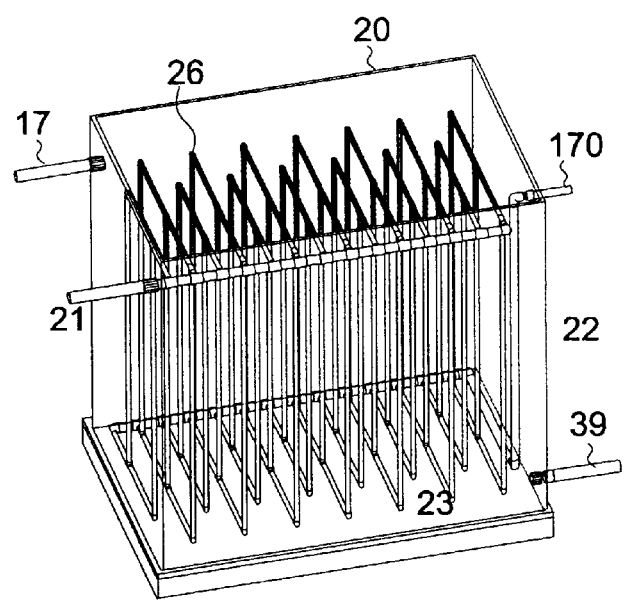
FIG. 4 is a perspective see-through illustration of the holding tank and heat exchanger according to the present invention.

With reference to FIG. 3, collection tank 12 (an enclosed structure) receives used wash water $W_{uw}$ from pipeline 11. Sump pump 13 located at the bottom 14 of collection tank 12 pumps the used wash water through pipe 16 to pipeline 17 which connects to holding tank 20 (FIG. 4).

Pipeline 59 connected to lint/grit basket 50 connects to pipe 15 in the interior of collection tank 12 so as to allow a water outlet for return water $W_{rw}$ associated with the lint and grit collected in the lint/grit basket 50.

Collection tank 12 is of such a size and volume so as to have a capacity greater than the total capacity of washing machine(s) which discharge into holding tank 12.

The tank can be made of any number materials including concrete, aluminum, metal, or polymers which will serve its intended purpose.

With reference to FIG. 4, holding tank 20 (an enclosed structure) receives used wash water $W_{uw}$ from pipeline 17 which connects to the holding tank 20 at the top of side 21. The used wash water $W_{uw}$ exits the holding tank at side 22 through pipeline 39. The temperature of the used wash water $W_{uw}$ as it enters the tank is several degrees Fahrenheit warmer than upon exiting as a result of a counter flow design of fluid motion which shall be subsequently explained.

Holding tank 20 may be constructed of concrete, metal, polymers or other suitable materials. In a 1050 gallon tank, if made of concrete, the walls and bottom of the holding tank are preferably three-inches thick 5000 psi concrete with a one-half inch rebar 12 inches on center.

If the tank is made of metal the bottom and sides should be one-quarter of an inch thick. If the tank is made of polymers, the walls and bottom are three-quarter inches thick.

Again, the various sizes and dimensions can vary depending upon the quantity of water going through the system.

Heat exchange piping 26 lies upon the bottom 23 inside of holding tank 20.

The heat exchange piping 26 in conjunction with holding tank 20 form a means of heat exchange from the used wash water $W_{uw}$ entering the tank to the clean and processed water $W_{cp}$ contained in the heat exchange piping.

The heat exchange piping 26 is preferably made of copper, stainless steel, galvanized metal or other appropriate material whose properties will transfer heat from the used wash water $W_{uw}$ to the heat exchange piping 26 and then to the clean and processed water $W_{cp}$ inside of the heat exchange piping 26.

Figure 5:
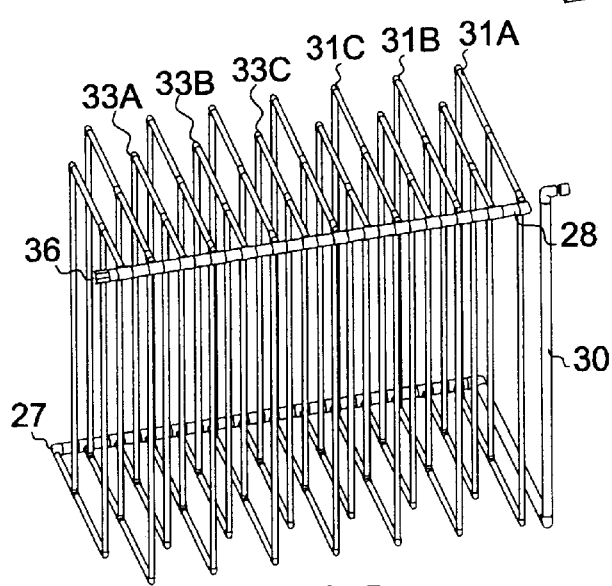
FIG. 5 is a perspective view of the heat exchange piping according to the present invention.

With reference to FIG. 5, the heat exchange piping 26 is provided with a pipe connection 30 which receives clean and processed water $W_{cp}$ from pipeline 170. Pipe connection 30 receives clean and processed water $W_{cp}$ from pipeline 170 with pipe connection 30 initially leading downward into holding tank 20 and then perpendicularly connecting to bottom manifold 27 which extends along the bottom 23 of holding tank 20. Connected to bottom manifold 27 are seven rows of three-prong piping 31A, 31B, 31C, etc., which connect to top manifold 28.

Located between and adjacent to each row of three-prong piping 31 are seven rows of two-prong piping 33A, 33B, 33C, etc. which are connected to bottom manifold 27 and top manifold 28.

The rows of three-prong piping 31 are parallel to one another and parallel to the rows of two-prong piping 33. Each row of three-prong piping 31 and each row of two-prong piping 33 is attached to and oriented toward the top manifold 28 and bottom manifold 27 in an orthogonal manner.

Figure 5A:
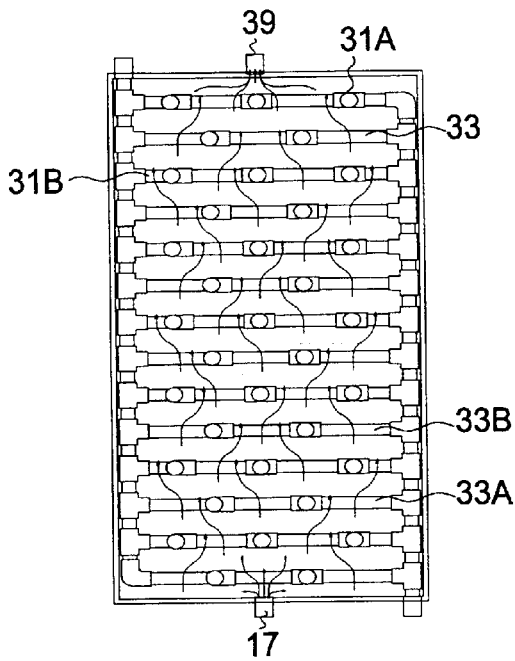
FIG. 5A is a top view of the heat exchange piping of the present invention.

In the top view of FIG. 5A, the alternating rows of three-prong 31 and two-prong 33 piping are arranged in orthogonal relation to bottom manifold 27 and top manifold 28.

Figure 5B:
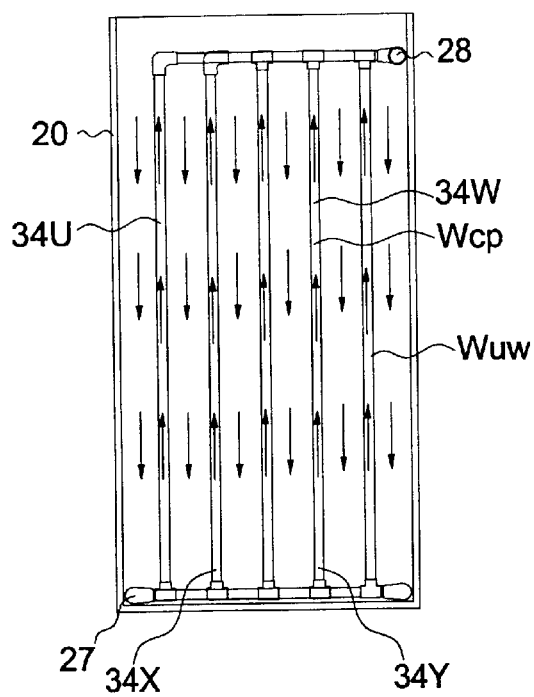
FIG. 5B is a side view of the heat exchange piping of the present invention.

In FIG. 5B, a side see-through view from side 21 of the holding tank, demonstrates how rows of three-prong 31 and two-prong 33 piping extend vertically and in orthogonal relation to bottom manifold 27 and top manifold 28. Further, FIG. 5B demonstrates the manner in which clean and processed water $W_{cp}$ travels upward through the vertical pipes 34U, 34V, and 34W of the three-prong piping 31 and through vertical pipes 34X and 34Y of two-prong piping 33. Conversely, the used wash water $W_{uw}$ travels in a downward direction in the interior confines of the holding tank 20.

Figure 6A:
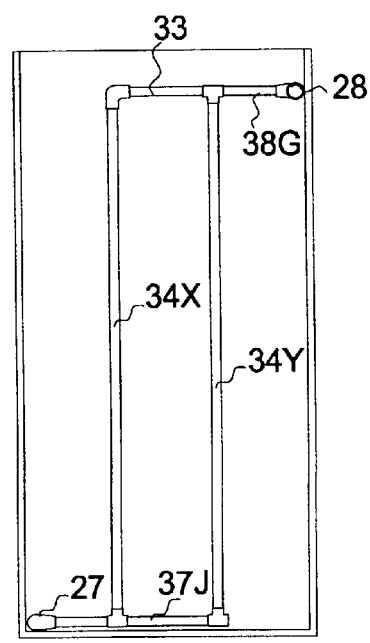
FIG. 6A is a schematic-side view of a two-pronged section of the heat exchange piping according to the present invention.
Figure 6B:
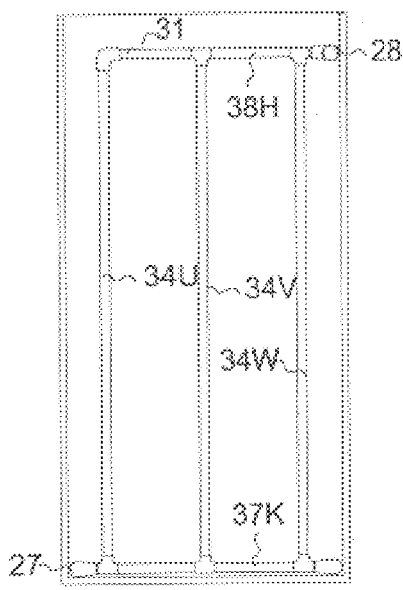
FIG. 6B is a schematic-side view of a three-pronged section of the heat exchange piping according to the present invention.

FIG. 6A and FIG. 6B are schematic-like side-views of a row of two-prong piping 33, and a row of three-prong piping 31, respectively.

In each row of two-prong piping 33, two vertical pipes 34X and 34Y connect in a perpendicular manner to horizontal sections of pipe 37J and 38G. Pipe 37J extends along the bottom 23 of holding tank 20 and connects perpendicularly to bottom manifold 27. Pipe 38G connects to top manifold 28 in a perpendicular manner.

In each row of three-prong piping 31, three vertical pipes 34U, 34V and 34W connect in a perpendicular manner to horizontal sections of pipe 37K and 38H. Pipe 37K extends along the bottom 23 of holding tank 20 and connects perpendicularly to bottom manifold 27. Pipe 38H connects to top manifold 28 in a perpendicular manner.

The manifold piping of the top and bottom manifold 28, and 27 is larger in diameter than the connecting piping of two-prong and three-prong piping 34U, 34V, 34W, 34X, 34Y, 37J, 37K, 38H, 38G. With the bottom and top manifold having a diameter of two inches, the connective piping of the two-prong 33 and three-prong piping 31 should be one-half inch in diameter.

The multiple vertical pipes 34 of the two-prong and three-prong piping 33 and 31 cause the clean and processed water $W_{cp}$ to travel slowly from the bottom manifold 27 to the top manifold 28 so as to allow for greater heat absorption. In addition, the perpendicular arrangement of the bottom and top manifolds to the two and three prong piping 31, 33 reduces and retards the angular momentum of clean and processed water $W_{cp}$ so as to provide an additional factor providing effective heat exchange from the used wash water $W_{uw}$ to the clean and processed water $W_{cp}$.

In operation, clean and processed water $W_{cp}$ enters the heat exchanger piping 26 after having traveled through pipeline 170 and travels vertically down pipe 30 toward the bottom 23 of holding tank 20. From there, the clean and processed water travels through pipeline 30, which is aligned in parallel to the respective horizontal pipe sections 37J and 37K, to the bottom manifold 27.

From the bottom manifold 27, the clean and processed water travels into the bottom horizontal pipe sections 37J and 37K and travels upward through the respective vertical pipe sections 34X, 34Y and 34U, 34U, 34W to the respective top horizontal pipe sections 38G and 38H to top manifold 28.

From top manifold 28 the clean and processed water $W_{cp}$ flows in the direction of outlet 36 (FIG. 5). Pipeline 172 connects to outlet 36 and provides a channel for the clean and processed water to exit the holding tank 20.

In the heat exchange piping 26 of holding tank 20, the clean and processed water $W_{cp}$ is heated as it travels upward through the vertical pipe sections 34 to the top manifold 28. This warming is due to the fact that the used wash water outside of the heat exchange piping 26 is warmer at the top of the holding tank.

Heat exchangers which are designed for high energy transfer rates with high flow velocities typically are shaped in coiled and spiral arrangements. However, in the system of the present invention, the energy transfer is low with the differential of water temperature typically varying from 10 to 15 degree F. Therefore, the orthoganol design and multiple vertical avenues of flow, allows the clean and processed water $W_{cp}$ to travel slowly through the heat exchange piping 26 to achieve the desired energy transfer.

Figure 7:
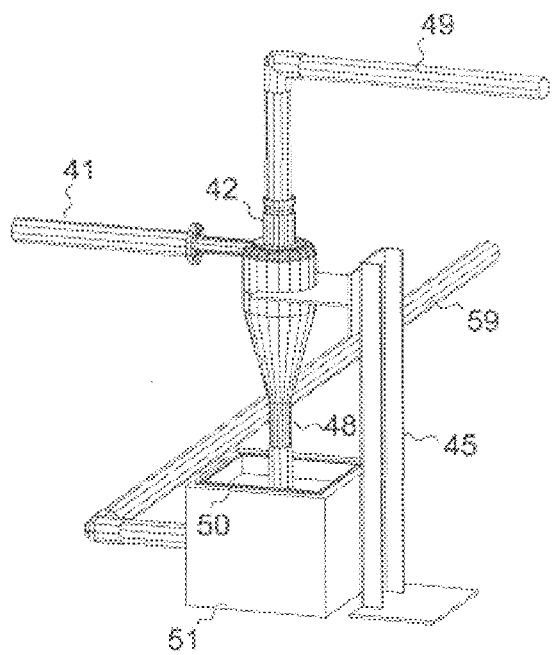
FIG. 7 is a perspective view of the lint/grit separator and lint/grit collection basket according to the present invention.

With reference to FIG. 7, a lint/grit separator 42 connected to stand 45 receives used wash water from the holding tank 20. The used wash water has traveled from holding tank 20 through pipe 39 to centrifugal pump 40 (FIG. 1) which accelerates the used wash water to lint/grit separator 42.

The best and most practical lint/grit separator currently known for use with the present invention is a Demco™ Cyclone Separator (Spec #4 H"–275#). However, substitute lint/grit separators can be utilized if such separators meet the desired standard.

The Demco™ Cyclone Separator removes all solids in excess of six microns and achieves this objective by subjecting the used wash water $W_{uw}$ to angular motion such that the higher density solids collect on the interior outer wall (not shown) of the separator due to the centrifugal forces experienced in the separator. These higher density solids slide down the interior outer wall of the separator to piping 48 where they fall into lint and solid collection basket 50.

The separator 42 is designed such that flow water, for removing the suspended solids from the separator 42, collects the suspended solids from the interior wall of separator 42 and causes these suspended solids to flow into the lint and solid basket 50 where the sink to the bottom of the basket 50 as a result of having a density greater than water.

Figure 8A:
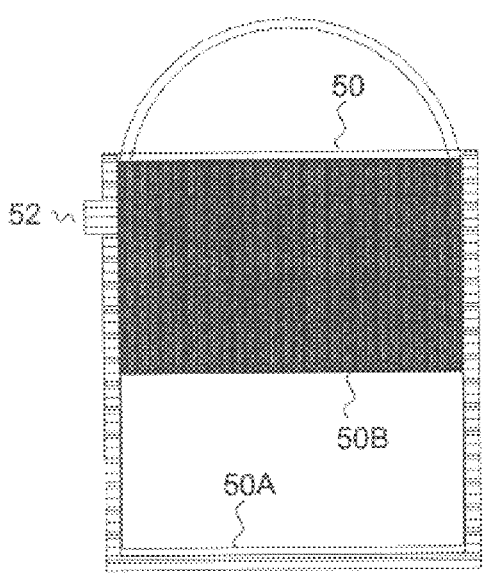
FIG. 8A is a see-through side view of the lint/grit collection basket of the according to the present invention.
Figure 8B:
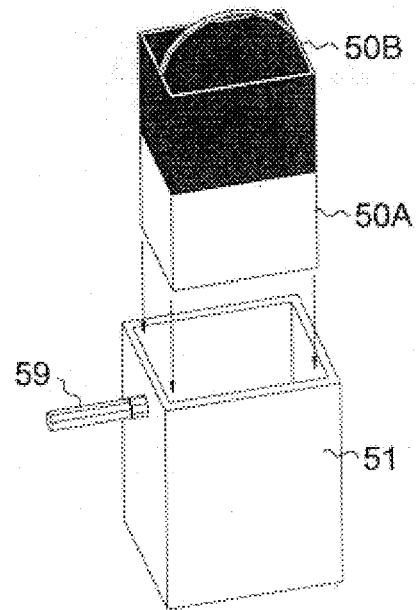
FIG. 8B is an exploded view of the lint/grit collection basket according to the present invention.
Figure 9:
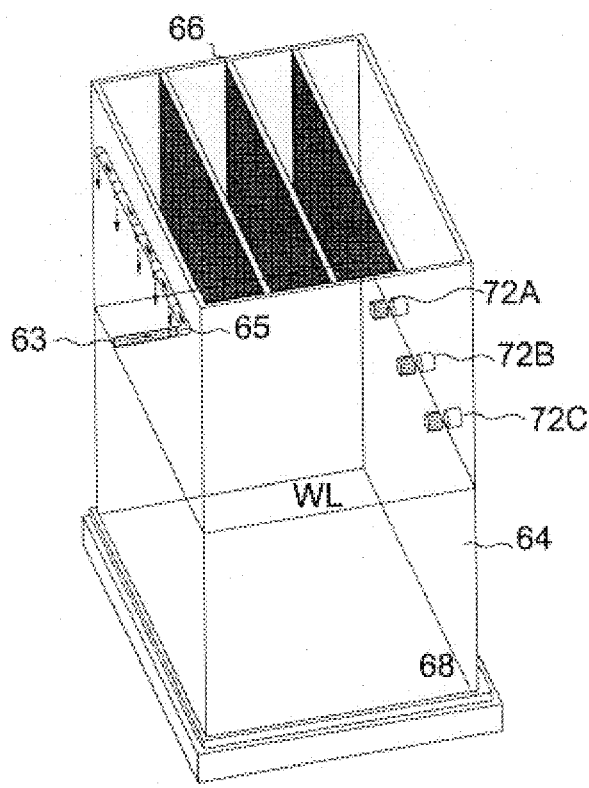
FIG. 9 is a perspective, partial see-through view of the lint filter of the present invention.
Figure 10:
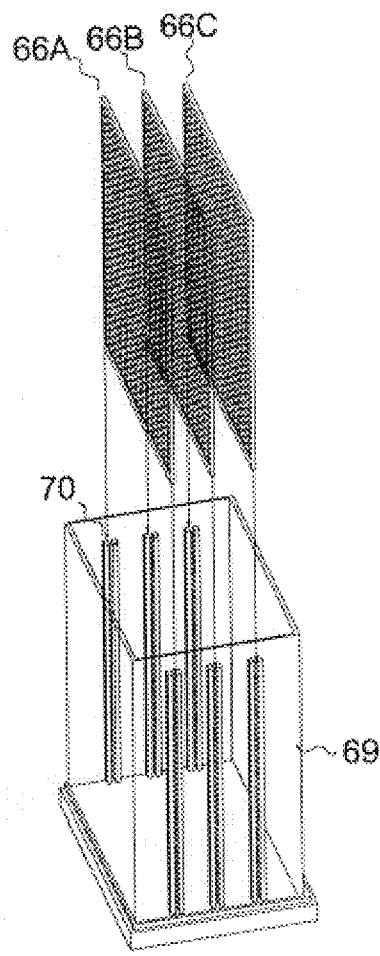
FIG. 10 is an exploded see-through view of the lint filter of the present invention and depicts the grooved guides for placing the removal screens.

With reference to FIGS. 8A and 8B, lint and solid collection basket 50 is designed to fit into a container 51 having a bottom and four sides. The collection basket 50 has an upper region 50B having numerous perforations which act as a strainer mechanism.

The lower region 50A of the collection basket is the collection area for the lint and grit which has been separated by separator 42.

In that the water falling into the collection basket 50 exceeds the capacity of lower region 50A to hold such water, this excess water is returned to collection tank 12 through pipeline 59. This excess return water $W_{rw}$ passes into pipeline 59 after passing through perforations in upper region 50B to an opening 52 on the side of container 51 which connects to pipeline 59.

The lint/grit separated water $W_{lg}$, having passed through the lint/grit separator 42 and into pipeline 49, is injected with ozone by ozone generator 60 (FIGS. 1 and 2) before proceeding through pipeline 62 to lint filter 64. The ozone causes the organic contaminants in the lint/grit separated water to separate and serves as a disinfectant.

The ratio of the lint/grit separated water $W_{lg}$ which continues from the return lint/grit separator 42 toward lint filter 64 as compared to the water $W_{rw}$ returned to the collection tank 12 is approximately 75 to one.

With reference to FIGS. 9, 10, 11 and 12, lint/grit separated water $W_{lg}$ enters lint filter 64 through entrance 63. Upon entering the lint filter 64 the lint/grit separated water $W_{lg}$ begins a trek through the lint filter which serves as a second stage of lint removal.

Lint filter 64 is provided with a series of mesh screens 66A, 66B and 66C. Each successive screen is provided with mesh of decreasing size. The screens are fitted into grooved slats 70 provided on one side 69 of the lint filter (FIG. 10) and into corresponding grooved slats provided on an opposite side of the lint filter to side 69.

Figure 11:
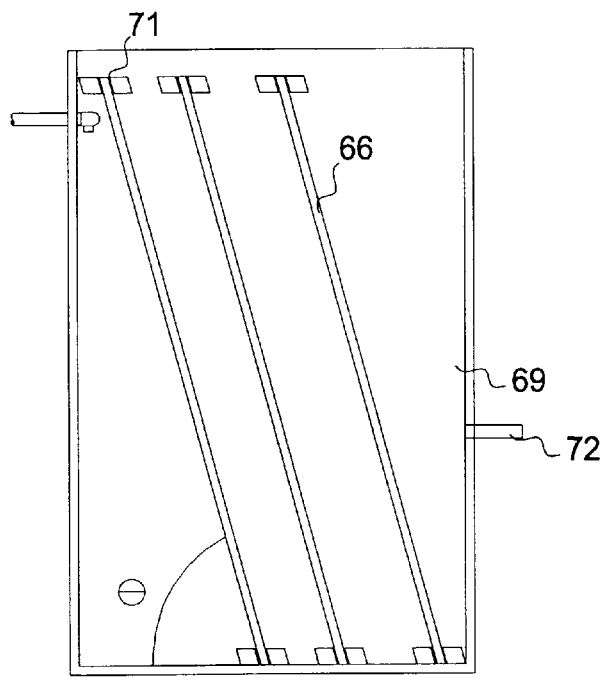
FIG. 11 is a schematic illustration depicting the angular relation of the lint removal screens to the spray nozzle and to the bottom of the lint filter.
Figure 12:
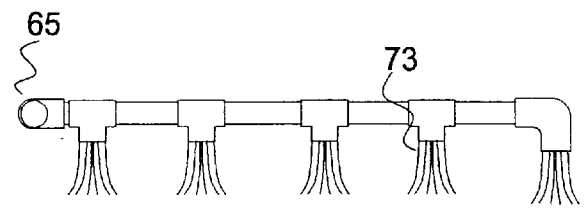
FIG. 12 is a perspective illustration of the spray bar and nozzle of the lint filter of the present invention.

Alternatively, the sides of the lint filter can be made to have grooves built into its opposite sides for accommodating the mesh screens 66; or, guide tabs 71 can be placed on the opposite side of the lint filter as portrayed in FIG. 11; or other manners to secure the mesh screens to the sides of the lint filter may be used. The mesh screens extend from just below the top of the lint filter to the bottom of the lint filter.

Upon entering entrance 63 the lint/grit separated water $W_{lg}$ enters a spray bar 65 which branches out laterally so that a plurality of spray nozzles 73(FIG. 12) evenly distribute the lint separated water $W_{lg}$ downward to the water level $W_1$ in the lint filter 64.

The screens 66 are arranged in parallel relation to each other but are angled forward toward entrance 63 to form an angle θ of 45 to 90 degrees in relation to the bottom 69 of the lint filter 64 as depicted in FIG. 11.

The lint contained in the lint/grit separated water is not allowed to leave the lint filter because small diameter lint is trapped by the screens 66.

The screens being arranged at an angle, most of the lint settles to the bottom, making cleaning of or replacement of the screens an easier task. Cleaning of the screens is done by taking off a removable top (not shown) of the lint filter 64.

Exits 72A, 72B and 72C are positioned below water level $W_l$ in the lint filter 64. Lint-filtered water $W_{lf}$ travels through the exits 72A, 72B and 72C and to corresponding pipelines 79A, 79B, 79C to the oil filter 80 (FIGS. 14 and 15).

The multiple pipes 72A, 72B, 72C result in a slow flow of water so that oil is inclined to separate from the lint filtered water as it enters the oil filter 80.

Figure 13:
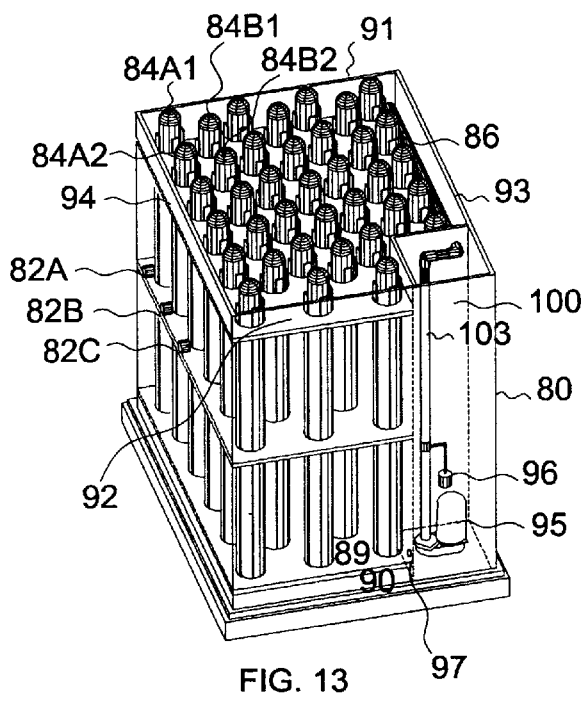
FIG. 13 is a see-through perspective view of a preferred oil absorption filter according to the present invention.

With reference to FIGS. 13, 14, and 15, lint-filtered water $W_{lf}$, enters oil filter tank 80 through entrance connections 82A, 82B and 82C which are connected to pipelines 79A, 79B and 79C which connect the lint filter 64 to the oil filter. The oil filter 80 is provided with an upper platform 85, a middle platform 87 and a bottom platform 89 which are used to secure rows of cylindrical hydrophobic socks $84A_1$, $84A_2 \ldots 84B_1$, $84B_2 \ldots$, etc.

The socks are made of 100% reclaimed wood fiber or other suitable hydrophobic material. The oil absorbing socks 84, being hydrophobic, allow water to pass by while absorbing free oil. The socks can be replaced by removing a removable top (not shown) of the oil filter.

The platforms are provided with holes (e.g., 88A, 88B, 88C) arranged vertically so that the oil absorbing socks 84 can be inserted through the holes.

Each hole 88 is provided with four slot guides 86 which are thin and stick shaped and which extend through each platform to easily guide the socks through the holes 88. The bottom platform 89 sits atop the bottom 90 of the oil filter 80. Thus, each hydrophobic sock extends through each platform 85, 87 and 89 and touches the bottom 90 of the oil filter 80.

The oil filter is formed and defined by sides 91, 92, 93, 94 and bottom 90. Side 91 is opposite to side 92 and side 93 is opposite to side 94.

The platforms 85, 87, 89 of oil filter 80 extend from side 91 of the oil filter 80 but do not extend all the way across to the other side 92 of the oil filter 80 allowing water flow between the platforms 85, 87 and 89.

A pumping chamber 100 is partitioned off from the rest of the interior components of the oil filter 80. Pumping chamber 100 lies in the corner of oil filter 80 and is formed by partition wall 101 and partition wall 102 which connect to each other and to walls 93 and 92 of oil filter 80, respectively. Platforms 85, 87, 89 connect to partition walls 101 and 102 and connect to sides 91, 92 and 94, but do not connect to side 93 of the oil filter 80 so as to create a flow channel between platform levels.

The lint filtered water $W_{lf}$ which enters the oil absorption filter 80 proceeds through entrances 82A, 82B and 82C proximate to the level of the middle platform 87 and below the water level in the oil absorption filter.

Upon entering the interior of the oil filter 80, free oil having a density less than water rises to the top of the lint filtered water $W_{lf}$.

The oil absorption socks 84 which are arranged in several rows cause the water flow to follow a weaving pattern such that contact with the socks 84 is maximized and free oil is trapped in the socks. The oil absorption socks can be easily removed and replaced with new oil absorption socks after extended use has caused them to become filled with free oil.

Oil-filtered water $W_{of}$ after having traveled around the rows of oil absorption socks 84 has but one path of travel to reach the pumping chamber 100. That path is provided through pipe or opening 97 which is located near the bottom of the oil filter 80 and which extends through partition wall 102.

As the oil-filtered water $W_{of}$ enters the pumping station 100 through pipe 97 the water level in the pumping station rises. As the water level rises, a float switch 98 is activated as float 96 rises upward on a guide rod. As float switch 98 activates, sump pump 95 is energized causing oil filtered water $W_{of}$ to be pumped into pipe 103. Oil filtered water $W_{of}$ is pumped from the sump pump 95 into pipe 103 and out of the oil filter through pipeline 104 to media filter 105.

Figure 17:
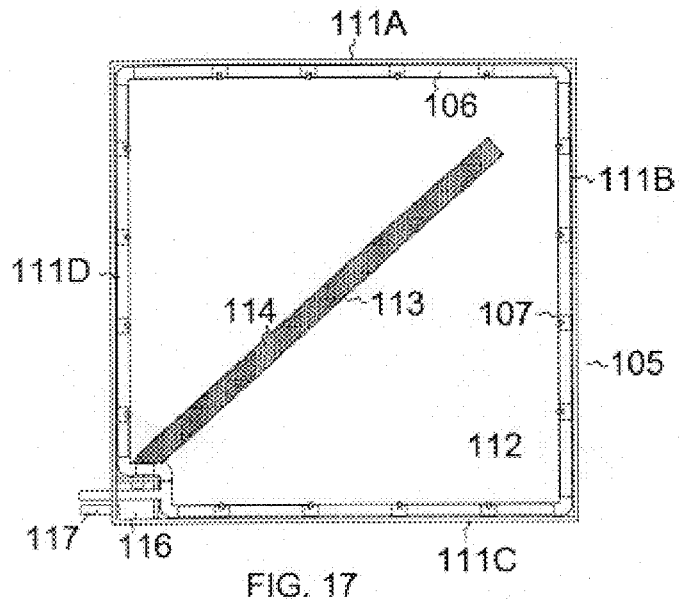
FIG. 17 is a see-through view of the bottom of the media filter viewed from the top.
Figure 18:
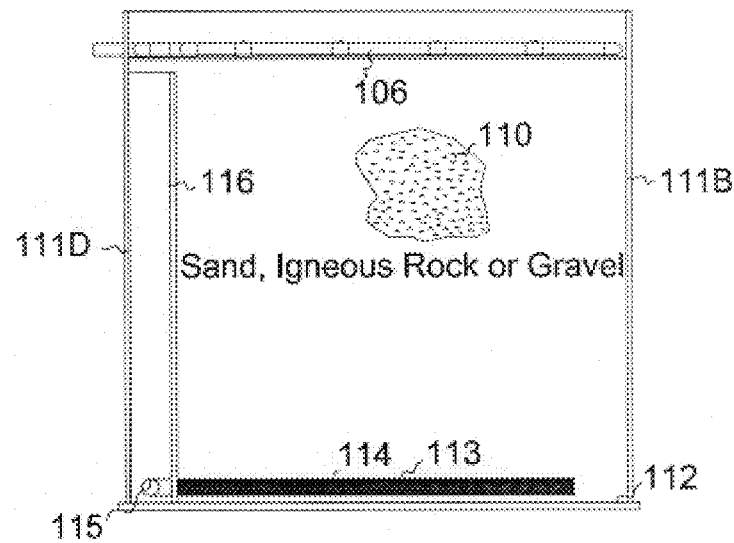
FIG. 18 is a see through view side-view of the media filter filled with igneous rock.
Figure 19:
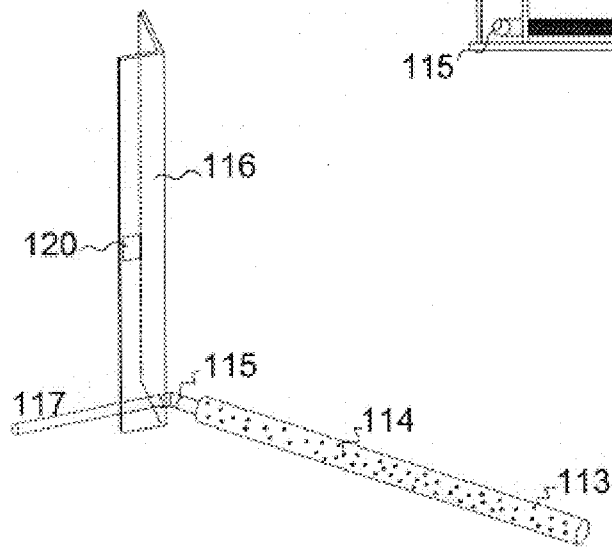
FIG. 19 is a schematic illustration of the overflow column in the media filter of the present invention.

With reference to FIGS. 16 and 17, oil-filtered water $W_{of}$ traveling through the pipeline 104 enters distribution piping 106 which extends around the top periphery of media filter 105 just inside walls 11A, 111B, 111C and 111D of the media filter 105.

The size of the media filter 105 is approximately 4 ft. by 4 ft. by 4 ft. or sized as conditions warrant. In high volume situations, an additional media filter could be utilized.

The media filter 105 is constructed to hold a medium 110 for removing contaminants such as suspended solids and hydrocarbons from the oil filtered water $W_{of}$ received from oil filter 80. The medium 110 contained in the media filter is igneous rock and/or sand from ⅛ inch in diameter to two inches in diameter or a material proven to have at least the same filtering capabilities.

The size of the media rock or sand will depend upon the type of water being recycled. Laundromats and uniform shops tend to have greasier more oily water than do motels, for example. Accordingly, the type of medium which fills the media filter will be a diameter best suited for a given operation. For greasier water, a larger diameter of media rock or sand is desired.

Media Filter Spray nozzles 107 located on the distribution piping 106 spray the oil-filtered water $W_{of}$ received from the oil filter 80 upon the top of medium 110. The medium 110 extends some three to four feet to the bottom 112 of the media filter 105. At the bottom of the media filter lies a collection pipe 113 which is a 3 inch diameter pvc pipe, or other appropriate piping, which is provided with multiple perforations 114.

As the oil filtered water is sprayed on the top of medium 110 by spray nozzles 107, the oil filtered water percolates through the medium 110 until it reaches the bottom 112 of the media filter.

Collection pipe 113 extends diagonally across the bottom 12 of the media filter with an end region 115 of the collection pipe 113 entering a six by six inch square partition column 116 which extends vertically in a corner of the media filter.

Upon reaching the bottom of the media filter, the oil filtered water $W_{of}$ is now media filtered water $W_{mf}$ which collects in pipe 113 and flows into the partitioned column 116 through end region 115 of the collection pipe 113. At the bottom of the partitioned column 116 is located an outlet pipe 117 which connects to pipeline 123 which leads the media filtered water toward the oil absorption filter 130 (FIG. 1).

The partitioned column 116 is provided with an activation switch 120 which is one fourth of the way up the column from the bottom of the media filter 105. This activation switch 120 turns on centrifugal pump 124 and ozone generator 127 which causes media filtered water $W_{mf}$ to exit the media filter 105 as a result of the draft created by pump 124.

The top of the partitioned column 116 is located some six or eight inches below the top of the media filter tank and acts as an overflow mechanism in that excess water will flow into the top of the column and will not spill out of the media tank.

Figure 20:
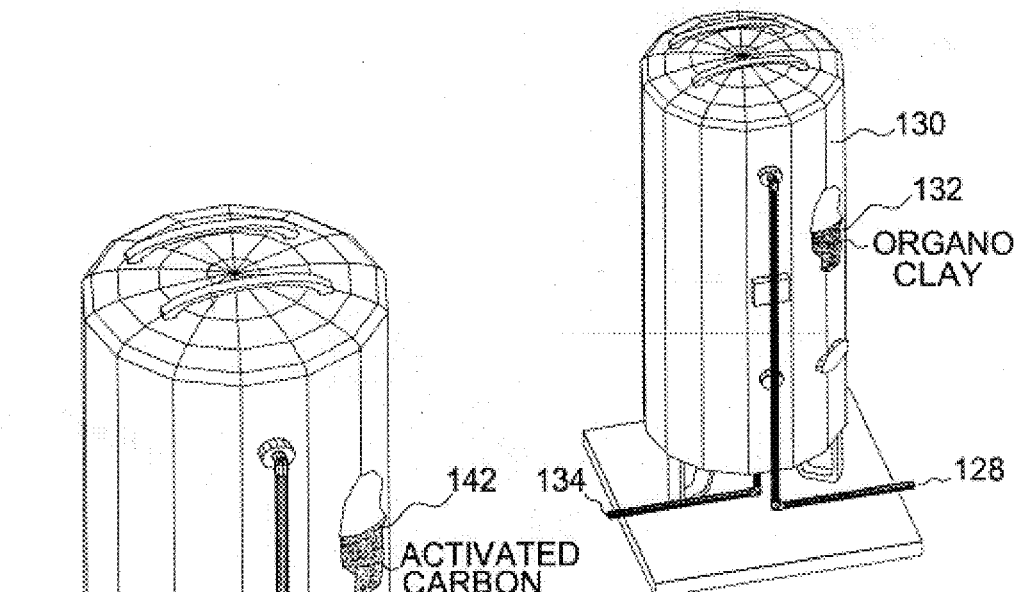
FIG. 20 is a perspective, partial see through view of the hydrocarbon absorption filter according to the present invention.

With reference to FIG. 20 and FIG. 1, the media filtered water passes from the media filter 105 to pump 124 to pipeline 125 where it is injected with ozone and proceeds on to hydrocarbon absorption filter 130.

The absorption filter 130 is a pressurized tank approximately six feet tall and 42 inches in diameter and is ⅔ full of organic clay 132.

The media filtered water is pumped at approximately 60 psi up into the top inner region of the tank (not shown) whereupon the media filtered water is further purified of emulsified hydrocarbons and some heavy metals as it seeps downward through the organic clay 132. Upon reaching the bottom of the absorption filter 130, the media filtered water is now considered to be absorption filtered water $W_{af}$ which proceeds through pipe 134 toward the activated carbon filter 140.

Figure 21:
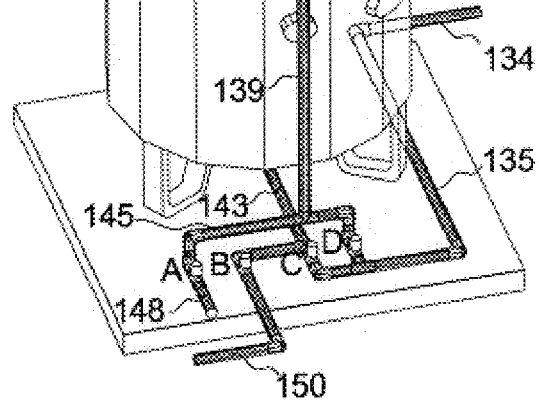
FIG. 21 is a perspective view, partial see-through view of the activated carbon filter according to the present invention.

With reference to FIG. 21, the activated carbon filter 140 is a pressurized tank similar in dimensions to hydrocarbon filter 130. However, activated carbon filter 140 is ⅔ filled with virgin activated carbon.

When the recycling system is in operation, the absorption filtered water $W_{af}$ travels through pipe 134 which becomes pipe 135. The absorption filtered water $W_{af}$ proceeds through pipe 135 and through open solenoid switch D which being open allows the water $W_{af}$ to pass into pipe 139 which distributes the absorption filtered water to the top and inside of the carbon filter tank 140. The hydrocarbon filtered water passes downward through the virgin 142 carbon to the bottom where it enters pipe 143.

When the recycling system is in operation, both solenoids B and D are open and solenoids A and C are closed.

Thus, carbon filtered water $W_{cf}$ exits through pipe 143 and proceeds through the open solenoid B and on to pipeline 150 which leads to final holding tank 156.

When the activated carbon filter 150 is backwashed after a daily operation, for instance, during the evening when the system is not in use, solenoid switches B and D are closed and the solenoids A and C are open for purposes of backwashing filter 150.

In the backwash mode, solenoid C is open to allow water to enter through pipe 143 with the backwash water proceeding upward to the top of the tank and out pipeline 139. The backwash water then enters pipe 145 and proceeds through open solenoid A to outlet pipe 148. Upon passing through pipe 148, the backwashed water proceeds through piping (not shown) to the collection tank (closed system) or to a drain outside the system.

The carbon filtered water $W_{cf}$ leaves the carbon activated filter through pipeline 150 to final holding tank 156.

Figure 22:
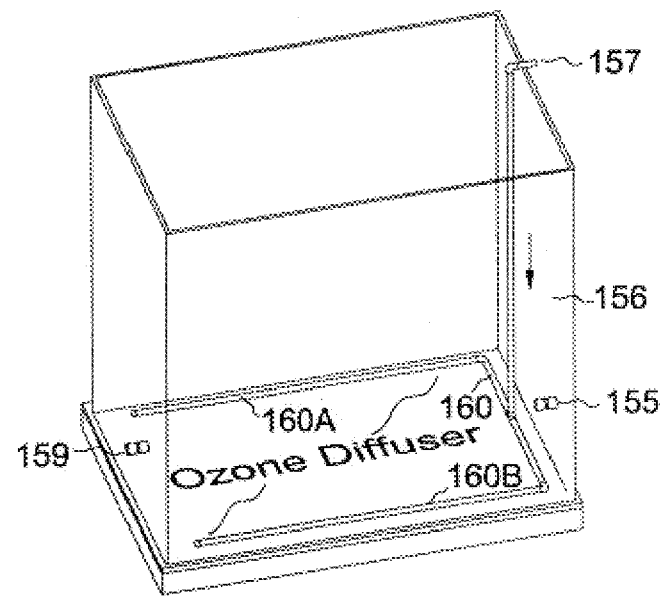
FIG. 22 is a see-through perspective illustration of the final holding tank according to the present invention.

With reference to FIG. 22 and FIG. 2, upon entering final holding tank 156 through opening 155 the carbon filtered water is exposed to ozone by means of ozone diffusion piping 160 which receives ozone from ozone generator 158 which is always on when the recycling system is in operation and has a built-in compressor.

The diffusion piping 160 is bifurcated into section 160A and 160B. A mechanical float is positioned approximately one-quarter of the way up from the bottom of the final holding tank, on a side of the final holding tank.

The mechanical float connects to tap water line 9 (FIG. 1); thus when the final holding tank is less than one-third full, the mechanical float 190 (FIG. 23A) opens a valve in tap water line 9 so that tap water enters the holding tank 156.

After the carbon filtered water $W_{cf}$ is exposed to ozone in final holding tank 156, the carbon filtered water becomes clean and processed water $W_{cp}$ and leaves the final holding tank through opening 159 to pipeline 162.

Connected to pipeline 162 is centrifugal pump 164 which is energized by pressure switches located in cold and hot water servers 4 and 6, respectively.

From centrifugal pump 164 the clean and processes water travels into pipeline 166 which connects to pipelines 168 and 170.

When the pressure switch in cold water server 4 is activated pump 164 is energized and water is switched into line 168. When the pressure switch in warm water server 6 is activated the clean and processed water proceeds through pipe 166 into pipe 170 and enters the holding tank 20 where it enters heat exchange piping 26 and is warmed and heated before exiting through pipeline 172 and entering warm water server 6.

Warm water server 6 is connected to the wash machine(s) 2 through line 5 and cold water server 4 is connected to wash machine(s) 2 through line 3. Upon the processed and cleaned water entering washing machine(s) 2, a wash cycle can take place and the recycling of used wash water can begin again.

Figure 23:
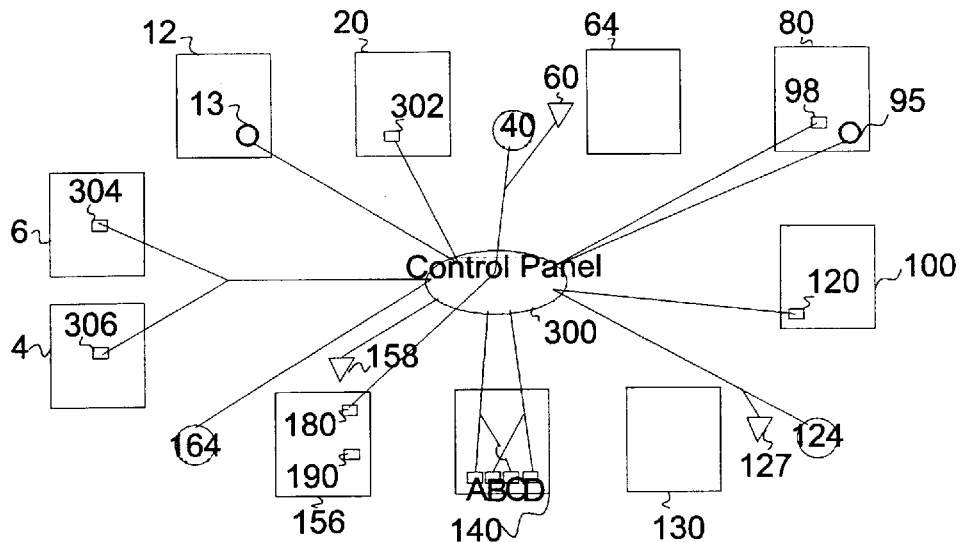
FIG. 23 is a schematic diagram of various, pumps, floats, and switches utilized by the recycling system of the present invention connected to a control panel.
Figure 23A:
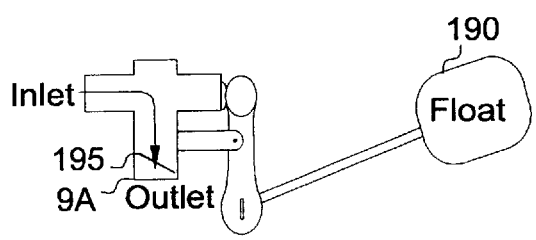
FIG. 23A is a schematic view of a mechanical float in the final holding tank for controlling tap water flow into the final holding tank.

The block diagram of FIG. 23 gives a schematic appreciation of how components in the elements of the recycling system of the present invention are electrically connected to a control panel 300.

The final holding tank 156 is provided with a level switch 180 that is electrically connected to the control panel 300 which gives a signal to pump 40 and to ozone generator 60 to turn on causing water to flow through the recycling system. Final holding tank is provided with a mechanical float switch 190 (FIG. 23A) which connects to tap water line 9. The mechanical float causes a valve 195 in the inlet of the tap water line to open so as allow tap water to flow into the final holding tank through tap water outlet 9A.

The mechanical float 190 is located on the side of the holding tank so as to open valve 195 when the holding tank is less than one-third and closes valve 195 when the holding tank is more than one-third full. Thus, the level float 180 and mechanical float 195 can call for water at the same time with the mechanical float closing the tap water line when the tank becomes one-third full and the level float causing pump 40 to shut off when the final holding tank is full.

Sump pump 13 in collection tank 12 is activated when a level or float switch 302 in holding tank 20 calls for more water when the holding tank is less than half full.

Upon the control panel receiving a signal from float switch 302 that the level of water is below a desired minimum level, the control panel sends a signal to sump pump 13 to turn on thereby causing water to flow from collection tank 13 to holding tank 20.

The oil separator 80 is provided with a level or float switch 98 in its containment compartment 100 which sends a signal to the control panel 300 to turn on sump pump 95 when the containment compartment 100 in the oil filter 80 is ⅔ full. Upon the sump pump turning on and the water level in the containment compartment going down as a result, the float switch 98 sends a signal to the control panel 300 to turn off sump pump 95 when the level in the containment compartment is ½ full.

In the containment chamber 116 of the media filter 105 a float switch 120 is provided which sends a signal to control panel 300 to turn on centrifugal pump 124 and ozone generator 127 when the water level in containment chamber 116 is more than ¼ full.

Water from the containment chamber of the media filter is then drawn toward the hydrocarbon filter tank 130 as a result of the activation of pump 124. When the recycling system is in operation the water from the hydrocarbon filter tank enters carbon filter tank 140.

This is made possible by the control panel 300 being connected to solenoid switches B and D open so that absorption filtered water $W_{af}$ can travel through pipe line 134 into carbon filter tank 140 and allowing carbon filtered water $W_{cf}$ to pass from the carbon filter 140 onto the final holding tank 156.

When the system is not in use, solenoid switches B and D are closed by timers on the control panel, and solenoid switches A and C are open so that the carbon filter tank can be backwashed.

The carbon filtered water $W_{cf}$ which leaves the carbon filter 140 is injected with ozone in the final holding tank 156. Ozone generator 158 is always on when the recycle system is in operation and has its own built-in compressor which connects to control panel 300.

A pressure sensor 306 in the cold water server 4 and a pressure sensor 304 in hot water server 6 send signals to the control panel 300 when the pressure in either server 4 or server 6 falls below a desired level. Upon receiving the signal from servers 4 and 6, the control panel 300 sends a signal to circulation pump 164 to turn on so that a desired water pressure is maintained in the servers 4, and 6.

Figure 24:
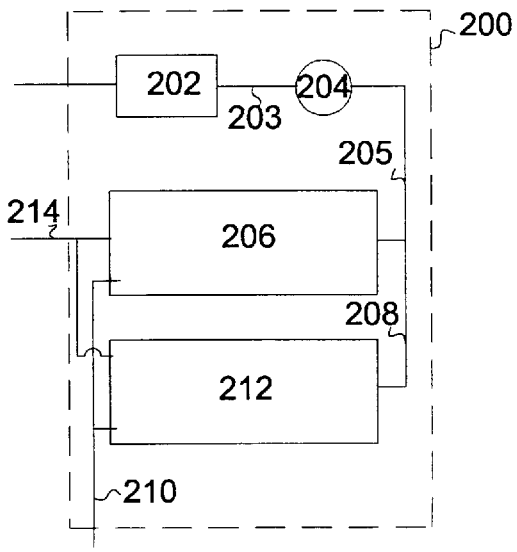
FIG. 24 is a schematic illustration of a reverse osmosis system for use with the recycling system of the present invention in conjunction with a dish washing facility.

With reference to FIG. 24 and FIG. 1, the reverse osmosis system 200 for use with the recycling system of the present invention is provided with a cartridge filter 202 which connects pump 204 through pipe 203.

From pump 204, the clean and processed water $W_{cp}$ enters pipe 205 and onto pipe 208 which bifurcates such that hyperfiltration filters 206 and 212 are arranged in parallel.

Hyperfiltration filters are taught in U.S. Pat. No. 5,639,374. Only mineral-free clean and processed water $W_{cp}$ enters the composite membrane pipe (not shown) located in the center region of the hyperfiltration filters 206, 212.

From the composite membrane pipe of filters 206, 212, clean soft water $W_{cs}$ suitable for washing dishes leaves filters 206 and 212 through pipe 214 which connects to a dishwater heater (not shown).

The clean and processed water not allowed into the composite membranes of filters 206, 212 exits the filters through pipe 210 for re-introduction into the recycling system 10.

In operation, the used wash water from laundry machine(s) 2 and/or used dish water from dish washer(s) (not shown) will enter the recycling system of the present invention through appropriate piping (pipeline 11), and be received by collection tank 12, where the step of collecting the used wash water takes place. The used wash water is then pumped out of the collection tank to holding tank 20 where the used wash water is used to heat the clean and processed water in the heat exchange piping. Thus, the used wash water is used in a step to heat the clean and processed water. By using the heat energy of the used wash water to heat the clean and processed water, utility costs are significantly reduced.

From the holding tank 20, the used wash water enters the lint/grit separator where solids exceeding six microns are removed and directed to lint/grit basket 50.

Thus, the lint/grit separator 50 can be viewed as a step in the recycling system in which lint and grit which exceed a certain size are removed from the used wash water. The lint/grit separated water $W_{lg}$ having gone through the lint/grit separator continues to the lint filter 64.

However, the lint/grit separated water is injected with ozone by ozone generator 60 before proceeding to the step of entering lint filter 64.

Lint filter 64 removes lint, threads, hair and other fine elements from the lint/grit separated water. Having passed through the step of ozone injection and through a second lint removal step by lint filter 64, the lint filtered water $W_{lf}$ continues to oil separator 80.

In oil separator 80, free oil is removed from the lint filtered water $W_{lf}$. Thus, oil separator 80 performs an oil removal step so that oil separated water $W_{os}$ proceeds to a media filtration step in media filter 105. Media filter 105 removes suspended solids and remaining hydrocarbons in the oil separated water $W_{os}$ as a result of the oil separated water proceeding through the igneous rock and/or sand of the media filter.

Upon passing through the media filter 105, the media filtered water $W_{mf}$ is further treated to an ozone injection before entering the hydrocarbon absorption filter 130 where the media filtered water as a result of the water pressure created by pump 124 is forced through the clay in the hydrocarbon absorption filtered.

This step of clay filtration of the media filtered water results in hydrocarbon filtered water $W_{hc}$ passing from the hydrocarbon absorption filter into the activated carbon filter 140 where soap in the hydrocarbon filtered water $W_{hc}$ is effectively removed.

The carbon filter 150 subjects the hydrocarbon filtered water to a carbon filtration step so that carbon filtrated water $W_{cf}$ passes into the final holding tank 156 where the carbon filtered water is further subjected to a final ozone injection step before leaving the final holding tank as clean and processed water $W_{cp}$.

Upon the clean and processed water leaving the holding tank, it may be channelled to cold water server 4 or continue to the heat exchange piping 26 in holding tank 20 for a temperature augmentation step before being introduced to warm water server 6. The clean and processed water in the cold and hot water servers is t hen ready for re-use by wash machine(s) 2.

If the recycling system of the present invention is to be used to recycle water from dish washer(s), a reverse osmosis step is called for which takes place in the reverse osmosis system 200 before introduction to a dishwater heater.

The collection tank 12, holding tank 20 and heat exchange piping 26, lint/grit separator 42, lint filter 64, and oil filter 80, media filter 105, hydrocarbon filter 130, carbon filter 140 and final holding tank 156 are viewed as elements of the recycling system of the present invention. In certain situations, it might be elected to use less than all of the above elements for purposes of achieving a given objective.

The present invention results in achieving significant reductions in energy and water costs associated with doing large quantities of laundry.

The present invention can be utilized by motels and hotels, laundromats, uniform shops and virtually any type of facility where a laundry-type operation is in place.

The recycling system of the present invention can be housed in a room adjacent to a laundry facility, in an adjacent shed, on the roof of a building or wherever appropriate for a given situation.

Further, the present invention can be utilized to recycle water used in dish washers. In addition, the present invention can be utilized to reduce water and energy costs in other areas besides laundry and dish washing.

The foregoing detailed description of the invention is intended to be illustrative and non-limiting. Changes and modifications are possible which utilize the above teaching. Thus, it is understood that the invention may be practiced otherwise than as specifically described herein and still be within the scope of the appended claims.

What is claimed is:

1. A lint filter useful for filtering lint-containing water originating from a wash machine, the lint filter comprising:

a tank for receiving lint-containing water;

means for distributing the lint-containing water into said tank on one side of the tank, said distributing means comprising a spray bar extending across said tank so that the lint-containing water is directed downwardly and evenly distributed thereacross;

a mesh screen extending from the bottom of said tank to above a water level of the lint-containing water in said tank and connecting to and extending across said tank such that the lint-containing water must pass through said mesh screen to exit said tank, said mesh screen in a spaced relation with the one side of said tank such that the lint containing water directed downwardly is evenly distributed within said tank before reaching said mesh screen, thus avoiding a direct streaming of the lint-containing water into said mesh screen;

exit means positioned on a side of said tank opposite to said one side, for allowing lint-filtered water which has passed through said mesh screen to leave said tank.

2. A lint filter according to claim 1, wherein:

said mesh screen is detachable from said tank.

3. A lint filter according to claim 1, wherein:

said mesh screen is of a size so as to trap small diameter hair and thread.

4. A lint filter useful for filtering lint-containing water originating from a wash machine, the lint filter comprising:

a tank having a bottom;

means for distributing lint-containing water into said tank on one side of said tank;

a plurality of mesh screens arranged in parallel and extending from the bottom of said tank to above a water level in said tank and connecting to and extending across said tank such that the lint-containing water must pass through said plurality of mesh screens to exit said tank, multiple exit means, positioned below and generally equally distant from the water level and on a side of said tank opposite to said one side, for allowing lint-filtered water which has passed through said plurality of mesh screens to leave said tank, said multiple exit means resulting in a desired slow flow rate of lint-filtered water exiting said tank.

5. A lint filter according to claim 4, wherein:

said plurality of mesh screens are angled so as to lean forward in the direction of said one-side of the tank, with each lint filter of said plurality of lint filters forming an angle of less than 90 degrees with the bottom of said tank so that lint and fine particles will fall to the bottom of the tank.

6. A lint filter according to claim 4, wherein each mesh screen is fitted with a mesh of a size which is different in size from the other mesh screens of said plurality of mesh screens.

7. A lint filter according to claim 6, wherein:

a first mesh screen of said plurality of mesh screens is positioned closest to said means for distributing, said first mesh screen has a larger size of mesh as compared to a second screen of said plurality of screens which has a size of mesh smaller than the size of mesh of said first mesh screen.

8. A lint filter according to claim 7, wherein:

said plurality of mesh screens are detachably connected to said holding tank so that said plurality of mesh screens can be easily removed and cleaned.

9. A lint filter according to claim 7, wherein:

said tank is provided with grooved slats for accommodating said plurality of mesh screens and for connecting said plurality of mesh screens to said tank.

10. A lint filter according to claim 7, wherein said means for distributing lint containing water is a spray bar which evenly distributes lint-containing water laterally across said tank.

11. A lint filter according to claim 4, wherein:

the lint containing water has originated as used wash water from a laundry facility, and said lint filter connecting to the laundry facility.

12. A lint filter useful for filtering lint-containing water originating from a wash machine, the lint filter comprising:

a tank for receiving lint-containing water therein;

a plurality of mesh screens arranged in parallel and extending from a bottom of said tank to above a water level of said tank and connecting to and extending across said tank such that the lint-containing water must pass through said plurality of mesh screens to exit said tank, wherein said plurality of mesh screens includes a first mesh screen having a mesh size larger than a second mesh screen positioned downstream therefrom;

means for uniformly distributing the lint-containing water entering into said tank on one side of said tank, said distributing means comprising a spray bar extending across said tank so that the lint-containing water is directed downwardly and evenly distributed thereacross for avoiding directly streaming of the lint-containing water onto a first of said plurality of mesh screens;

multiple exit ports positioned below the water level for allowing lint-filtered water which has passed through said plurality of mesh screens to leave said tank, said multiple exit ports resulting in a desired slow flow rate of lint-filtered water exiting said tank.

13. A lint filter according to claim 12, wherein said multiple exit ports are in a horizontal alignment with each exit port generally equally distant from the water level.

14. A lint filter according to claim 12, wherein said spray bar of said distributing means comprises a plurality of spray nozzles, and wherein each of said plurality of spray nozzles directs the lint-containing water vertically downwardly and proximate said one side of said tank.

* * * * *